United States Patent [19]
Vaill

[11] 3,719,829
[45] March 6, 1973

[54] LASER BEAM TECHNIQUES
[75] Inventor: Jack Roy Vaill, Alexandria, Va.
[73] Assignee: Versar, Inc., Springfield, Va.
[22] Filed: April 10, 1970
[21] Appl. No.: 27,369

[52] U.S. Cl. .................307/149, 343/700, 315/149, 331/94.5
[51] Int. Cl. ..............................................H02j 1/00
[58] Field of Search......315/149, 150, 151, 152, 153, 315/154, 155, 156, 157, 158, 159; 331/94.5; 307/149; 343/700; 200/152 R

[56] References Cited

UNITED STATES PATENTS 3,404,403  10/1968  Vallese et al. .................331/94.5 X
3,295,012  12/1966  Barbini ..............................200/152

OTHER PUBLICATIONS

IBM Technical Disclosure Bulletin, 315/150 Vol. 5, No. 12, May 1963, pp. 71 and 72

Primary Examiner—Herman J. Hohauser
Attorney—Alexander & Dowell

[57] ABSTRACT

Apparatus and methods in which a laser beam or other light source of comparable steradiancy is employed to establish a low-level ionization trail through a gas medium, and then auxiliary means external to the optical source is employed to increase the ionization within that initial trail to a high level, whereby to form a more highly conductive path over which useful amounts of electrical energy can be conducted for the transmission of intelligence or power.

12 Claims, 7 Drawing Figures

INVENTOR
JACK ROY VAILL

INVENTOR.
JACK ROY VAILL
BY
Alexander & Dowell

LASER BEAM TECHNIQUES

This invention relates to improvements in laser beam methods and systems, where the beam is passed through a gas medium in an effort to establish a long, straight, well defined path of low-level ionization, and auxiliary means is then employed to render this path highly conductive.

"Laser means" as used hereinafter includes not only presently known lasers as such, but also other light sources of high steradiancy which will excite ionization in a medium.

A laser beam of suitable wavelength can penetrate through a gas medium over great distances and will establish a partially ionized trail therethrough which is straight. However, where the length of the trail must be great, the degree of laser-induced ionization must be relatively low, because high ionization concentrations absorb the laser energy and make the trail substantially opaque to the beam. If the beam were concentrated, for instance by focusing, to a degree sufficient to cause substantial cascade ionization of the gas in the trail, then the trail in the completely ionized region would have a degree of conductivity sufficient to make it a useful electrical conductor, but its length would necessarily be short. This short ion path of high conductivity has been used for various practical purposes, for instance in Barbini U.S. Pat. No. 3,480,876 to trigger gas-filled spark gaps, or in Vallese et al U.S. Pat. No. 3,404,403 to establish in the air adjacent conductive increments to form a monopole antenna radiator. Thus, it is known that a laser beam by itself can be used in a gas medium to lay down an ionization trail of some length having low concentration, or to establish a highly-ionized path which is, however, of short length. The Vallese et al patent constitutes a recognition of this fact, and is an effort to get around the inability of the prior art approaches to create a highly ionized path of greater length.

It is a principal object of this invention to provide an improved system including laser means capable of establishing in dense gaseous media a long trail which is highly ionized and can be used as an efficient conductor.

It is a more specific object of this invention to use a laser beam to establish a low-ionization trail in a gas medium, and to use this trail to guide a high-powered auxiliary ionization increasing discharge along the straight ion path established by the initial laser beam. The resistance per unit length of the initial trail laid down by the laser beam would be measured in megohms per meter, but when its ionization has been increased to a substantially complete level, i.e. on the order of $10^{19}$ ions/cc at atmospheric pressure, then the path resistance per unit length would be measured in terms of a few ohms per meter, or less, depending upon the radius of the ionized channel.

The present technique of using auxiliary means for increasing the initial trail ionization can be applied to either C.W. or pulsed laser systems, or to systems combining both types. The pulsed type has certain advantages. In the first place, a pulsed system can achieve greater instantaneous levels using practical apparatus and amounts of input energy, and therefore, the effective length of the ionized path can be made greater for a given apparatus. In the second place, as time goes by after the highly-ionized path has been established, it will tend to lose its straight-line configuration and will begin to wander transversely in serpentine configurations, which wandering, once started, will grow progressively worse. Therefore, the periodic extinguishing of the path in a pulsed system is beneficial since it allows such excessively unstable ionization to die out so that it can be re-established in a new path which is both straight, and highly defined and concentrated.

The laser means used to establish the initial ionization trail should be selected with regard to energy, pulsewidth and wavelength so that it provides neither too much nor too little ionization concentration in the trail. Where the initial trail is to be laid down in a gas medium it is important that the laser beam not provide too high a degree of ionization in a limited spatial volume, because highly ionized air becomes a poor transmitter of laser beam energy. The air molecules readily absorb optical beams and become ionized to such an extent that the trail becomes opaque to further passage of the beam energy. Consequently, only a very short highly-ionized path would be established in the medium, i.e. too short to serve as a usefully long conductor in those configurations where length is an important factor.

On the other hand, if a beam of only weak ionizing ability is employed, little or no ionization trail will be obtained.. An optical laser beam having a wavelength, or color, within the spectrum range of $0.15\mu$ to $1.5\mu$ appears to be best for the purpose of the present invention. In fact, in recent laboratory experiments a Neodymium-glass laser was used to generate an optical beam at a wavelength of $1.06\mu$. This beam created an initial ionization path in air which was able to guide a high-voltage discharge along the path and create a channel of high conductivity. In these experiments, atmospheric air served as the gas medium, the air having approximately $2.5 \times 10^{19}$ molecules/cc. To start with, the degree of ionization in this atmospheric air, due for instance to cosmic radiation, was negligible, probably in the range of ten ions per cc. Although it is difficult to measure the ionization within a laser beam establishing a trail through a gas medium, it is believed that the ionization of this initial trail was substantially higher than $10^{10}$ ions/cc. This degree of ionization proved to be sufficient to form the initial trail, which then served to channel the auxiliary discharge and thereby raise the ionization to the level required to form a highly conductive path. The initial beam was passed through two electrodes spaced by 24 inches, and then high voltage pulses of 350 kilovolts from an auxiliary source were discharged through the trail between the electrodes. The laser beam and the voltage discharge from the auxiliary source were both pulsed, and therefore it was necessary to synchronize them quite accurately.

It is of course well known that with sufficient voltage a high voltage discharge between two electrodes can be obtained in the absence of a pre-ionized trail of any type. For a particular gas medium, and a particular electrode configuration, a certain voltage will discharge between the electrodes over a distance which is often referred to as a breakdown length, and when such a discharge occurs, the path formed by the discharge tends to meander and wander transversely of a straight line between the electrodes, so that the path does not remain straight. The provision of a laser trail between the electrodes accomplishes two purposes, namely, to lengthen the discharge so that the same voltage will discharge between electrodes spaced apart further than a normal breakdown length, and to establish a straight path through which the breakdown occurs without a tendency to wander, at least in its initial stages. In the above mentioned experiment, the Nd-glass laser beam extended the path length from about 18 or 19 inches which would be the normal breakdown length of separation between the electrodes in the absence of the laser beam to a 28 inch separation which represents an extension approaching 40 percent, approximately. Photographs taken of the discharge using the laser beam to lay down an initial ionization trail clearly showed a very direct and straight line initiation of the discharge between the electrodes. The pulse from the auxiliary high voltage source lasted 100 microseconds, and produced ionization in the cascade region of about $10^{19}$ ions/cc. Shortly thereafter, the high voltage pulse terminated so that both the pulse and the laser trail were extinguished, thereby permitting the ionization to die out in the highly conductive path region between the electrodes until the next discharge was applied. The invention is of course not to be limited to degrees of ionization in the cascade region, in view of the fact that lower degrees of ionization may be useful depending upon the particular purpose which the invention seeks to accomplish in a practical configuration. It is believed that the initial trail ionization in air should be such as to provide at least $10^{10}$ ions/cc and perhaps as much as $10^{15}$ ions/cc concentration, and that the high degree of ionization accomplished by the discharge from the auxiliary source should reach from a concentration in the neighborhood of $10^{16}$ up to and including the cascade region of at least $10^{19}$ ions/cc at atmospheric air pressure, or higher for higher gas pressures.

The high voltage supply used for the auxiliary source should be sufficient to provide reliable breakdown over the length of the initial ionization trail required for a particular application of the invention. The 350 kilovolt source referred to above was adequate for laboratory proof of the principle of the invention, but would of course be considered small as compared with the source required for longer range practical applications of the invention. Any auxiliary source has lower limits for both its voltage and its energy. In the present numerical example, the voltage was selected at 350 kilovolts, and the supply was capable of delivering energy in the neighborhood of 130 Joules. If the voltage is too low, the discharge will not take place over the desired trail length. Moreover, if the source cannot supply sufficient energy, even a very high voltage will not cause the ionizing potential wave associated with the propagation of the electrical discharge to travel very far along the beam trail which provides the initial ionization. This is because the source must deliver sufficient energy to the breakdown streamer to allow it to continue ionizing the air as the tip of the ionizing potential wave proceeds along the initial trail. Thus, the voltage required is related to and increases with the length of the trail to be ionized, corrected for the increment by which the partial ionization will extend the breakdown length because of initial trail ionization. The energy in Joules required to excite the gas molecules in the trail into ionization can be calculated in advance knowing the density of the molecules and the approximate diameter and length of the laser trail over which the auxiliary ionizing potential wave is to be discharged.

This invention sets forth methods and apparatus for establishing highly ionized conductive paths in gas media where the length of the path is referred to sometimes as "relatively long". The "long" path when referred to herein is defined as being long with respect to the length of the path which could be highly ionized directly by the optical beam acting alone without further ionization caused by energy delivered from an auxiliary source into an initial ionized trail, i.e. an auxiliary high-voltage discharge therealong; or, in the case of the two laser embodiments, the path is "long" as compared with the length of a high level ionization path length through the gas medium which the shorter wavelength laser beam would establish in the absence of the longer wavelength laser's action. The disclosure also defines a degree of ionization which is considered as "low" concentration and a degree of ionization which is considered as "high" concentration. Having selected a particular path length to be established, one should select a type of optical beam, i.e. radiation wavelength, power and energy which will provide an optimum ionization over that entire path length. If the path length is relatively short, a relatively efficient ionizing beam can be used to provide good ion concentration in view of the fact that its penetration through the gas does not have to be very long. On the other hand, if a relatively long ion path must be established, then a beam of lower ionization efficiency will have to be used, which will provide a lower initial ion concentration in the trail. The reason for this trade-off has been set forth above and lies in the fact that high ion concentrations absorb beam energy and reduce the distance to which the laser beam can penetrate into the gas medium. In any event, the degree of ionization caused by the laser beam in establishing the initial trail will be considered to be "low" ionization concentration, and at atmospheric air pressure may extend from somewhere in the vicinity of $10^{10}$ ions/cc to $10^{15}$ ions/cc. The "high" ultimate ion concentration, attributable to the laser trail having had its ion concentration raised by the auxiliary discharge, may extend all the way from 100 percent ionization down to something just above the upper limit of the initial trail ionization, namely something in the vicinity of, or above, $10^{13}$ ions/cc.

The above experiment was performed using a Marx generator, this generator having a 100 microsecond duration output at 350 kilovolts. The effectiveness of the auxiliary ionizing potential wave from the high-voltage generator can be improved by superimposing an A.C. ripple on top of the generator pulse. This can be done either by adding L-C components in the generator itself to make it ring at a frequency which is high enough to place plural A.C. cycles on top of the generator's D.C pulse, for instance, at 100 kilocycles, or alternatively by adding an oscillator or a driven L-C circuit through which the generator's pulse is applied to the ionization trail, the resonant frequency of the added circuitry being such as to provide plural cycles of alternating component on top of the generator's pulse, for instance again, at 100 kilocycles so as to provide 20 or more cycles superimposed upon the 100 microsecond pulse of the Marx generator.

The techniques described in this disclosure may be used in other gases than air, and at other gas densities than atmospheric density. The detailed atomic and molecular structure of each of the various gases governs the interaction of laser beams with them, because such properties as energy levels, collision cross-sections, multiphoton absorption efficiencies, and excited state lifetimes combine to determine the effectiveness of a given laser beam for producing ions in a given medium. For example, to produce a given fraction of ionization in helium gas at a given density would require a much more energetic laser pulse than would be needed to produce the same fractional ionization in cesium vapor at the same density. Propagation characteristics of ionizing potential waves also depend on such properties as ionization potentials, cross-sections, etc., which vary from gas to gas. The gas density at constant composition affects the laser interaction and the streamer propagation as well. In general, at densities below atmospheric, higher laser powers are required to attain a given fraction of ionized gas, because fewer gas molecules are in the beam cross-section and because cooperative effects between molecules become less likely. Generally, at higher than atmospheric densities, higher voltages are needed to generate streamers; at lower densities lower voltages will cause streamers to cross a fixed spark gap, down to a limit of approximately 1/1,000 of atmospheric density, where the range again begins to decrease with decreasing density. Therefore, in situations where one or more parameters such as laser power and wavelength, discharge voltage, gas composition, gas density, or path length are fixed, the other of these parameters can be varied to obtain the desired operation.

Another object of this invention is to provide a modified embodiment in which two different lasers are used to provide the highly ionized path sought for the invention. It is a fact that a source of electromagnetic energy having too long a wavelength will not produce any significant initial ionization in a gas medium. This is true for instance of wavelengths extending from below the microwave region to the infrared region. However, when the wave-length of the radiation becomes short enough so that the photon energy becomes comparable to the internal energy characteristics of the gas molecules, then the output of a laser will cause ionization in a trail extending through a gas medium. Thus, in this modified embodiment of the invention, the laser which lays down the initial low ionization trail should be a laser which delivers an output within the shorter infrared region or in a portion of the visible spectrum extending to the shorter wavelengths thereof, and here again the Nd-glass laser provides a satisfactory beam to accomplish this purpose, although doubled Ruby or doubled Nd-glass radiation would also be effective. On the other hand, the auxiliary radiation source should provide a beam which is not stopped by having its energy absorbed by the initial ionization in the trail of the first laser beam. For this purpose, a short wavelength laser would be undesirable. Therefore, a second laser should be selected for the auxiliary ionizing source whose output has a longer wavelength, which is both efficient at passing through the partially ionized initial trail and is also efficient when interacting with such a trail to raise the energy level of the ions in that trail so as to cause the ions to rapidly multiply and form the desired highly ionized path. For this purpose, a $CO_2$ gas laser providing output in the longer wavelength infrared spectrum is useful as the auxiliary source. As a matter of fact even a low frequency source can be used, such as microwave source, providing some type of wave guiding means is also employed to concentrate the microwaves in the vicinity of the initially ionized trail. Such concentration of microwaves could be accomplished by waveguide and waveguide-termination means. Thus, according to this modification of the invention a laser having a beam in the infrared or shorter wavelength spectrum would be used to establish the initial ionization trail, and a lower frequency laser source or even a microwave source would be used to excite the initial trail ionization and raise its ion concentration to provide a more highly conductive ionized path through the gas medium. The use of a second laser as an auxiliary ionization-increasing source would be particularly helpful in the case where a beam is directed into the atmosphere in such a manner as to make it difficult to place spaced electrodes along it.

The present invention is useful for many different applications, in providing a highly conductive transmission path capable of conducting either intelligence or power. Such a transmission path can be used to complete a circuit using the earth as a return path, or two such transmission paths can be established between stations for the purpose of "two-wire" transmissions therebetween. Moreover, a highly conductive single path established by the present invention can be used to discharge clouds, to discharge aircraft or missiles approaching or leaving the earth and having undesirable electrostatic charges on them, or to establish in the air an antenna monopole. In the latter case the initial ionization trail is extended into the atmosphere by the laser, and then the auxiliary source is used to increase its level of ionization to a useful level of conductivity for an antenna radiating element. Either a second laser beam can be used as set forth in the preceding paragraph to raise the degree of ionization to form the antenna radiating path, or else a high voltage pulse energy source can be coupled between ground and the base of the laser beam, such a source being provided with sufficient energy capability to propagate the pulse in the form of an ionizing potential wave tip which travels up the initial laser beam trail for a height which is determined by the number of Joules which the auxiliary source can deliver, it being recalled that when the energy of the source is exhausted, the ionizing potential wave tip stops travelling up the beam trail. Undoubtedly, many other uses for the highly ionized path established by the present invention will occur to persons skilled in the art.

Other objects and advantages of this invention will become apparent during the course of the following discussion of several practical configurations of the invention as shown in the following drawings, wherein.

Figure 6:
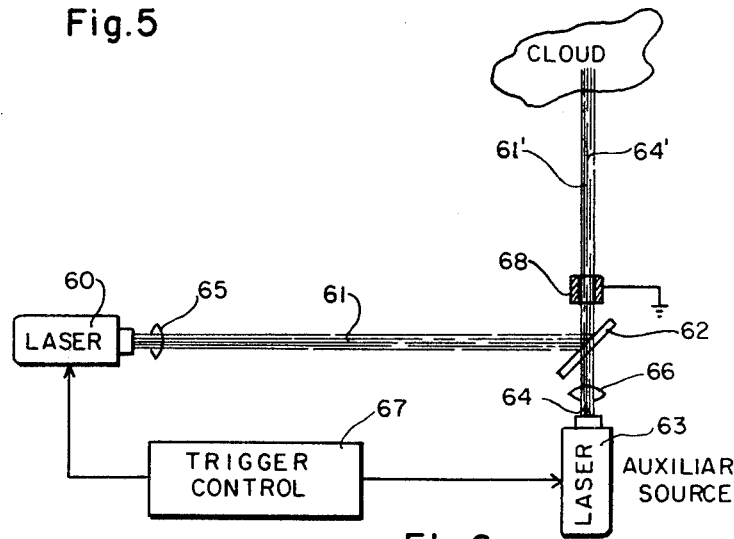
Figure 7:
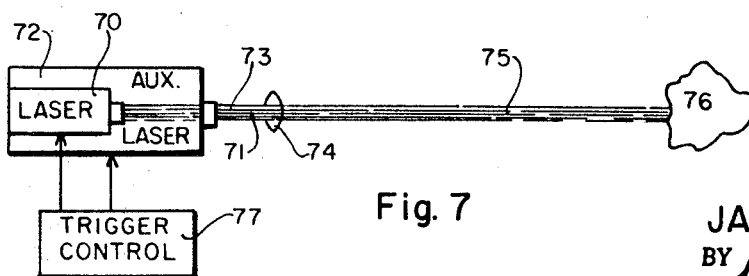

FIG. 6 is a modified form of the invention in which a laser lays down a low ionization trail, and an auxiliary laser of longer wavelength propagates an intense beam along the line of the initial ionization trail made by the first laser to provide a high-ionization conductive path, which for instance may be used for discharging a cloud or some other object located at a remote position along the beam; and FIG. 7 shows a coaxial laser system in which a first laser lays down a low ionization trail and a second laser having different characteristics is located coaxially with respect to the first laser and propagates a high powered beam along the same trail to provide a still higher conductivity path.

Figure 1:
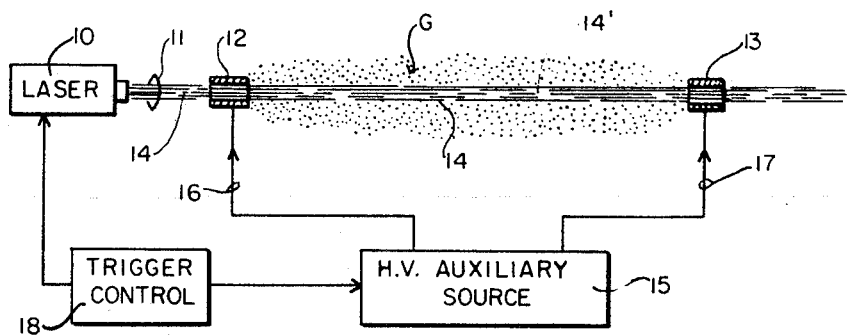
FIG. 1 is a schematic diagram according to the invention showing a laser establishing a low ionization trail in a gas medium, and auxiliary source means discharging through the trail to make it a high conductivity path.

Referring now to the drawings, FIG. 1 shows a first laser 10 passing a beam 14 through a focusing lens 11 and through 2 electrodes in the form of sleeves 12 and 13. The laser 10 is selected such that the wavelength of its beam provides a trail of low level ionization in a gas medium G as compared with complete ionization of the gas medium. In subsequent views of the drawings, the gas medium G will not be repeated, but is assumed to be present, for instance in the form of atmospheric air. The system also includes a high voltage auxiliary source 15 having a large potential difference between its output leads 16 and 17 which are connected respectively to the electrodes 12 and 13. The high voltage source, as well as the laser, are controlled by a suitable control circuit 18 so as to cause the auxiliary source to apply its voltage between the electrodes 12 and 13 at a time when the laser beam 14 is present and passing through those electrodes. In the event that the laser 10 and the auxiliary source 15 provide outputs which are continuous, as distinguished from pulsed, the control circuit will comprise merely on-off means, but where pulsed lasers and/or pulsed auxiliary source means are used, the control circuit 18 will comprise a trigger, suitable for firing the laser and the auxiliary source, and also for controlling the rate at which the laser 10 and the aux-iliary source 15 repeat their outputs. As pointed out previously in the present specification, pulsed systems have the advantage of providing quiescent intervals between their output pulses during which the ionized plasma in the portion 14 of the beam which is located between the electrodes can die out to permit the system to start all over again and re-establish a straight-line highly conductive path of narrow and well defined proportions. As will be seen in connection with the discussion of FIG. 2, the high voltage plasma streamer continues to expand radially as well as longitudinally along the trail established by the laser, and eventually the resulting plasma would expand to provide a trail of poorly defined radial extent if it were not periodically extinguished by the control circuit 18.

Figure 2:
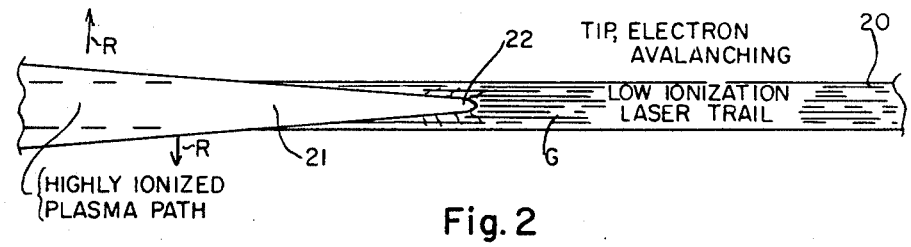
FIG. 2 is a diagram showing schematically the manner in which an ionization potential wave is propagated along a low ionization trail laid down by a laser, the ionizing potential wave having a tip at which electron avalanching occurs to propagate the wave along the laser trail.

FIG. 2 shows a diagram illustrating the manner in which an ionizing potential wave or electrical breakdown streamer propagates along a low level ionization trail laid down by a laser, for example, performing in the near infrared spectrum or at a shorter wavelength. This trail is labelled 20 in FIG. 2, whereas the high voltage wave which is propagating to the right is labelled 21 and has a field terminating in a tip 22. At the tip 22 electron avalanching continuously takes place to propagate the potential wave along, as long as the energy of the auxiliary source creating the ionizing potential wave is great enough to sustain it despite the loss of energy been dissipated from the tip to ionize the gas molecules G located within the low level ionization trail portion 20. Assuming that most of these gas molecules become ionized, the resulting path 21 will comprise a plasma which is highly conductive and which is progressing not only rightwardly along the plasma trail 20, but also radially in the direction of the arrows R. It happens that the longitudinal progress of the tip 22 is much more rapid than the radial expansion of the plasma path, and therefore, the path remains fairly well defined for a usable interval of time. However, if the auxiliary source maintains its high energy input into the plasma path 21, it will eventually begin to wander in radial directions and will tend to grow unevenly to produce "kink" instabilities which are undesirable in a system where straightline propagation of the path is important. The sharpness of the tip 22 concentrates a high temperature in its vicinity which aids in the ion formation by photoionization of the gas. It is important that the ionization of the trail initially laid down by the laser and labelled 20 be adequate to keep the tip 22 running along it, rather than striking out in a direction of its own selection. In general, the higher the potential of the ionizing wave 21, the hotter its tip, and therefore, the higher the trail ionization must be in order to successfully guide the tip along the trail laid down by the laser.

Figure 3:
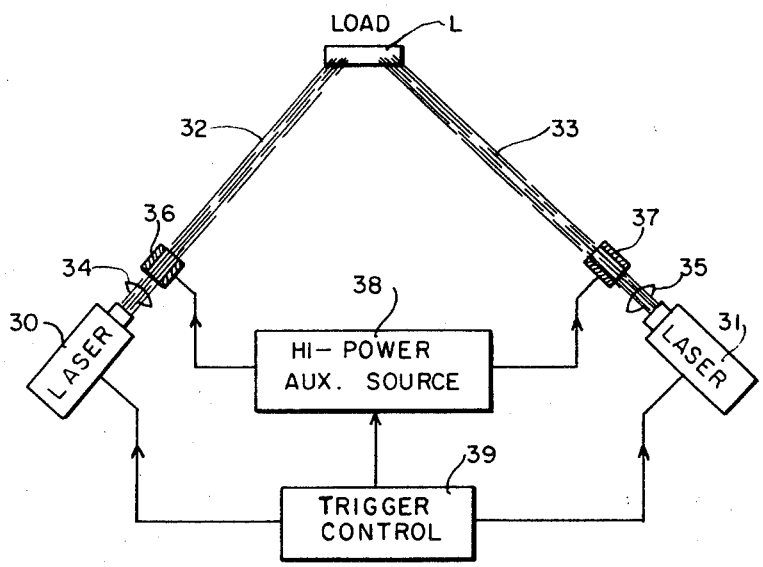
FIG. 3 is a diagram of a modified form of the invention in which a high powered auxiliary source is discharged through a gas medium into a remote load using two similar lasers, each coupled to the auxiliary source and their beams impinging upon different points of the load so that the two laser beams, the power source, and the load are all in series.

Referring now to FIG. 3, this figure shows two identical lasers 30 and 31 each delivering a beam trail 32 and 33, respectively through suitable optical focusing means 34 and 35, and the beams 32 and 33 also passing through electrode coupling means 36 and 37. The beam from each laser is focused upon a load L which can be remote from the lasers 31 and 32, which lasers may be directed by mechanical tracking means so as to maintain their beams always impinging upon the load. A high powered auxiliary source 38 is connected at its output so as to place a high voltage potential difference upon the electrodes 36 and 37, and thereby place the source in series with the beams 32 and 33, through the load L. A suitable control means 39 serves to control the firing of the two lasers 30 and 31 and also to fire the high powered source 38 across the load through the beams 32 and 33 at a time when the latter are present. In a pulsed-beam pulsed-source system, the control 39 would comprise a trigger circuit for controlling the synchronization between the lasers and the source. The application of the high powered output from the auxiliary source across the load L results not only in ionization to a higher degree of the beams 32 and 33 extending from the coupling electrodes 36 and 37 to the load, but also places the power source 38 across the load, either for constructive or for destructive purposes. In the former case, the system becomes a power transmission system perhaps serving an inaccessible station, whereas in the latter case it could serve as a hole drilling system or as a destructive weapon, for example.

Figure 4:
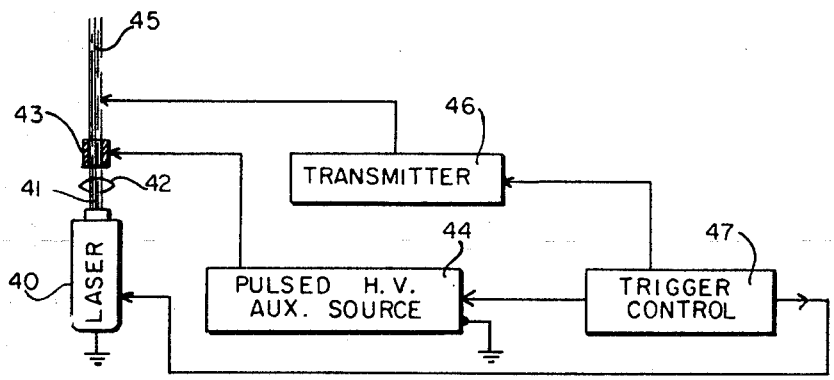
FIG. 4 is a further modified embodiment of the invention showing a laser beam passing through a gas medium, such as air, to form a vertical monopole trail of low conductivity, and showing a pulsed auxiliary power source applied near the lower end of the monopole to raise its ionization by propagating an ionization potential wave upwardly along the laser beam path.

Referring to FIG. 4 a system is shown in which a laser 40 delivers a beam through a suitable focusing lens 42 and through a coupling electrode 43. This beam can be directed into the air from the ground, for instance for the purpose of providing a mono-pole radiating antenna whose radiator comprises the ionized laser trail intensified by the auxiliary source 44 to provide a highly conductive monopole 45. In a pulsed system, the laser is selected to provide the required degree of ionization into the air to conduct a high voltage pulse from the auxiliary source 44 and guide it upwardly. The pulse is then applied between ground and a point on the beam 41, the pulse being supplied by an auxiliary source 44 having sufficient energy-delivering capability to propagate the pulse up the laser trail and form the highly conductive radiator monopole 45, to which signal intelligence from a transmitter 46 can be coupled. The trigger control 47 controls both the laser 40 and the high voltage pulse source 44, and indeed may also control the transmitter 46 so that its transmissions occur only when the highly conductive monopole has been erected in the air and is present to broadcast the signal intelligence applied to it by the transmitter 46.

Figure 5:
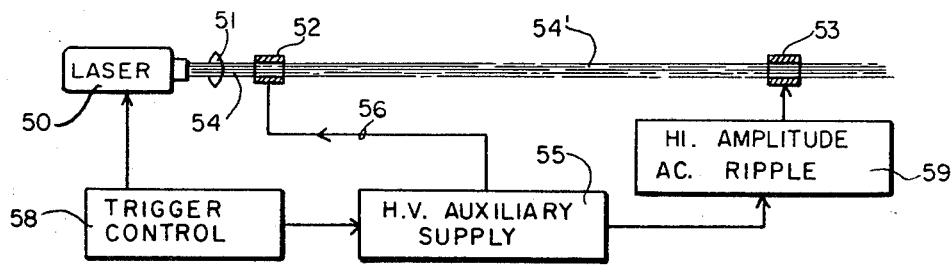
FIG. 5 shows a system similar to FIG. 1, but wherein a component of alternating ripple is applied on top of the high-voltage auxiliary supply potential before applying the high voltage supply to the low ionization trail laid down in a gas medium by the laser beam.

FIG. 5 shows an embodiment similar to FIG. 1 and including a laser 50 delivering a beam 54 through suitable focusing lens means 51 and between two spaced electrodes 52 and 53. A high voltage auxiliary source 55 is coupled by a wire 56 to one electrode, and has its other high voltage lead coupled to the other electrode by way of a high-amplitude AC ripple source 59. A control circuit 58 controls the laser and the auxiliary supply in the same manner as discussed in connection with FIG. 1. The high amplitude AC ripple circuit 59 comprises a simple LC circuit which responds to the shock of the pulse from the high voltage power supply 55 to provide a ripple component in series with the power supply voltage and at the ringing frequency of the ripple circuit 59, which is high enough to provide at least a few alternating cycles on the top of the unidirectional pulse from the high voltage auxiliary supply 55. The presence of the AC ripple on top of the high voltage pulse from the supply 55 improves the conductivity of the path 54' over that laid down by the laser beam 54 by increasing the Joule heating loss over the streamer path and thereby creating more ionization, and consequently increasing the conductivity of the channel. One suitable type of auxiliary supply 55 comprises a Marx generator which is of the type that discharges internal storage means to provide the main pulse output of the supply. It is also possible to internally alter such a high voltage supply by adding inductance at appropriate points within the generator, so as to cause its capacitance to resonate with the added inductance and thereby produce the AC ripple component on top of the discharged pulse from the generator.

FIG. 6 shows an embodiment using a different auxiliary source, which does not comprise a high-voltage ionizing potential wave, but instead comprises an electromagnetic wave having characteristics differing from those of the electromagnetic wave put out by the laser 60 which forms the initial low-ionization trail 61. This trail is applied to a partial mirror 62 which directs the beam 61 upwardly as shown at 61' to form part of a vertical beam, in the present illustration. In this embodiment, the auxiliary source comprises another laser 63 which delivers an output beam 64 passing through the mirror and becoming another beam component of the upwardly directed path 64'. Both beams are focused by suitable optical means such as the lenses 65 and 66 and both lasers are triggered by suitable control means 67 which may control either CW or pulsed lasers as may be desired for the present application. Although the beam 61', 64' is shown as being vertical in the particular illustration, it is of course obvious that the beam can be directed in any direction desired. A beam which is vertical can be particularly useful for discharging a cloud, or a helicopter, or some other body. For this purpose the beam is passed through a suitable electrode coupling means 68 which is connected to ground. The two lasers are of different wavelengths, the initial trail laser 60 providing a beam whose wavelength is in the near infrared region of the spectrum, or shorter, so as to provide good ionization of the air while at the same time being able to penetrate the air high enough to perform the useful purpose required. On the other hand, the laser 63 comprising the auxiliary source must deliver a beam whose wavelength is long enough that it can penetrate an ionized path and maintain or increase that ionization, this beam preferably having a wavelength in the infrared region or longer. An example of a device operating at a longer wavelength comprises a microwave system capable of channeling a microwave beam along the ionization path initially defined by the trail of the laser 60. There are various well known optical systems, such for instance as a Cassegrain reflector, that can be employed in the combination of the two laser beams, depending on the wavelengths of the radiation and upon the transverse profile of beam intensity.

FIG. 7 is similar to FIG. 6, to the extent that the auxiliary source therein also comprises a high-intensity electromagnetic radiation source rather than an electrical discharge source. In this example, a trail establishing laser 70 lays down a low ionization beam 71 while an auxiliary laser 72 propagates a high intensity beam of longer wavelength 73. Both beams pass through suitable optical focusing means 74 and are focused into a composite coaxial beam 75 which can be used for any useful purpose, for instance, making contact with an object 76. The two lasers 70 and 72 are triggered by suitable control means 77 which may operate them either in the CW or in the pulsed mode. As discussed above, the laser 70 which lays down the low ionization trail should deliver light in the near infrared spectrum or above it into the ultraviolet spectrum, and the auxiliary laser 72 which is located coaxially with respect to the laser 70, should deliver its radiation at a frequency below the visible portion of the spectrum, for instance, in the infrared portion. Other configurations of the two-laser system are of course possible to achieve specific results by superimposing the beams from two different lasers. As in the description of FIG. 6, it should be noted that there are various other beam-combining optical trains which can be employed to advantage, depending on the nature and physical extent of the beams.

The following claims are presented covering the novel features of the invention, as illustrated by the above embodiments.

I claim:

1. A system for establishing a highly ionized straight line conductive path in a gas medium, comprising:
   a. laser means operative to pass through said medium a beam of intensity sufficient to lay down an initial ionization trail having a first degree of concentration;
   b. an auxiliary high voltage output source coupled to discharge energy in the form of an electrical streamer tip along said ionization trail and increase the ionization concentration in the trail to a second higher degree to thereby establish said straight line conductive path through the medium; and
   c. the concentration of the initial ionization trail being at least as great as the minimal concentration of ionization necessary to guide the high voltage streamer tip over the length of the path in a straight line, but being less than an excessive concentration at which the ionization of the portion of the trail nearest the laser will attenuate the energy of the beam reaching the remaining portion of the trail and thereby reduce the concentration in the latter portion below said minimal concentration.

2. In a system as set forth in claim 1, conductive electrode means coupled to the initial ionization trail at positions spaced therealong, and said auxiliary high voltage source comprising a high-energy electrical power supply coupled to discharge along said trail between said electrode means.

3. A system for establishing a highly ionized conductive path in a gas medium, comprising:
   a. a load intended to receive a power discharge through it;
   b. laser means operative to pass through said medium beams which intersect said load and lay down ionization trails of low concentration to the load; and
   c. an auxiliary high-energy output source comprising a high voltage electrical power supply coupled to the laser means such that the load and the laser beams and the auxiliary source form a series-circuit operative to discharge power therethrough and increase the ionization concentration in said trails to establish said highly conductive path.

4. In a system as set forth in claim 1, said laser means comprising a periodically pulsed laser, and said auxiliary source comprising a pulse-discharge power supply, and said system including control means for discharging the source into the initial ionization trail produced by the laser beam.

5. In a system as set forth in claim 4, conductive electrode means coupled to the laser trail, and said control means including means to actuate said auxiliary source to discharge into the laser-produced trail while it is present.

6. In a system as set forth in claim 5, said laser means being on the ground and directing a beam into the air, and said auxiliary source being coupled between ground and said beam, and pulsing the latter periodically to form a more-highly conductive monopole radiator.

7. A system for establishing a highly ionized conductive path in a gas medium, comprising:
   a. laser means operative to pass through said medium a beam of intensity sufficient to lay down an ionization trail of low concentration; and
   b. an auxiliary high energy output source coupled to discharge that energy along said low ionization trail and increase the ionization concentration in the trail to a high degree to thereby establish said highly conductive path through medium, said auxiliary source comprising a high-voltage high-energy power supply having alternating ripple components superimposed thereon.

8. A system for establishing a highly ionized conductive path in a gas medium, comprising:
   a. laser means operative to pass through said medium a beam of intensity sufficient to lay down an ionization trail of low concentration;
   b. an auxiliary high energy output source coupled to discharge that energy along said low ionization trail and increase the ionization concentration in the trail to a high degree to thereby establish said highly conductive path through the medium; and
   c. said laser means radiating at a relatively shorter wavelength and establishing a first ionization trail, and said auxiliary source comprising another laser radiating at a relatively longer wavelength and directed along said first trail and operative to augment its ionization.

9. In a system as set forth in claim 8, means for coaxially superimposing said first and second trails.

10. The method of establishing in a gas medium a long highly conductive path having an initial portion and having a terminal portion, including the steps of passing through the medium an electromagnetic beam of energy density sufficient to establish an ionization trail having an ionization concentration approaching but less than such a degree that the ionization in the initial portion of the path will attenuate the beam energy and prevent it from ionizing the terminal portion of the path, and propagating energy along said trail when established at a very much higher level sufficient to greatly increase the degree of ionization in the trail and form said highly conductive path.

11. The method as set forth in claim 10, including the step of propagating electrical energy along the trail by discharging it through the trail between electrodes spaced therealong.

12. The method as set forth in claim 10, including the step of radiating electromagnetic energy along the trail by intermittently pulsing it into the trail at a selected location thereof.

* * * * *